Sept. 8, 1964
B. H. CLASON
3,148,254
PADDLE TYPE FLOW INDICATOR SWITCH
Filed July 20, 1962
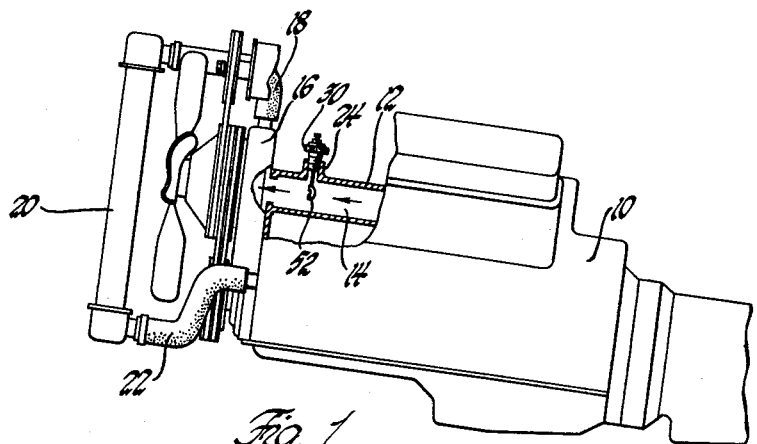
Fig. 1
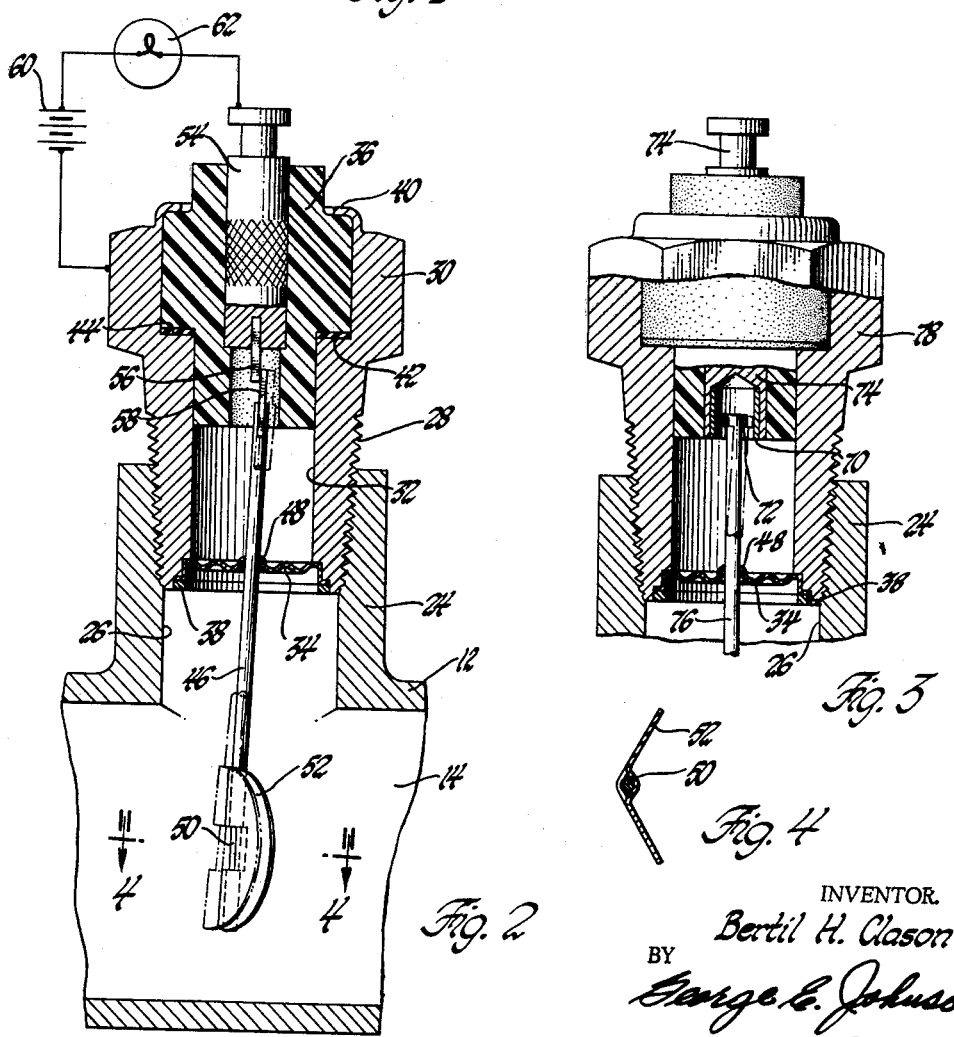
Fig. 2
Fig. 3
Fig. 4
INVENTOR.
Bertil H. Clason
BY George E. Johnson
ATTORNEY

United States Patent Office 3,148,254
Patented Sept. 8, 1964

3,148,254
PADDLE TYPE FLOW INDICATOR SWITCH
Bertil H. Clason, Flint, Mich., assignor to General Motors Corporation, Detroit, Mich., a corporation of Delaware
Filed July 20, 1962, Ser. No. 211,260
5 Claims. (Cl. 200—81.9)

This invention pertains to electrical switches and more particularly to flow switches which may conveniently be associated with conduits to indicate the flow of fluids through them.

It is obviously advisable and advantageous in the use of an automobile propelled by an internal combustion engine always to know whether coolant circulation in the latter is effective and also whether the supply of engine coolant is adequate.

To the above end, an object of the present invention is to provide an improved flow switch which will indicate the existence or lack of an adequate flow of fluid in a conduit and yet which is simple in construction and low in cost.

A feature of the present invention is a flow switch comprising a housing easily attachable to a conduit and supporting a paddle which is preferably self-alignable with fluid flow in the conduit and which includes contacts through which a signal circuit may be rendered effective.

These and other important features of the invention will now be described in detail in the specification and then pointed out more particularly in the appended claims.

In the drawings:

FIGURE 1 is an elevation view of an automobile power plant with a portion of the engine broken away better to show the manner of installation and use of one embodiment of the present invention.

FIGURE 2 is an enlarged sectional view of the flow switch and a part of the engine as shown in FIGURE 1, a break with flow signal circuit being illustrated diagrammatically;

FIGURE 3 is a partially sectionalized view somewhat like that of FIGURE 2 but showing a different form (make with flow) of electrical contacts; and FIGURE 4 is a sectional view of a self-aligning paddle taken on line 4—4 of FIGURE 2.

In FIGURE 1, an automobile engine is shown at 10, this engine having the usual conduit or conduit portion 12 defining a flow passage 14 for engine coolant. This passage is arranged to lead to a coolant pump 16 having a discharge 18 leading to the upper portion of a radiator 20. The bottom header tank of the radiator 20 is connected by a conduit 22 to the engine 10 for the return of the engine coolant to the latter.

The engine cooling jacket or conduit 12 bears a flange 24 defining an opening 26 leading into the flow passage 14. This flange is internally threaded to receive a threaded portion 28 of a metallic plug 30. This plug is formed with a through aperture 32 which is closed at one end by a flexible and undulated metallic diaphragm 34 and at the other end by an insulator plug 36 of suitable plastic or hard rubber. The diaphragm is held in place by a pressed-in metal ring 38 and the insulator plug 36 is retained within the plug 30 by crimped over portions 40 integral with the plug. A sealing washer 42 is employed between the plug 36 and an inner shoulder 44 of the plug 30.

A rod 46 has an intermediate portion soldered as at 48 to the central portion of the diaphragm 34 for pivotal action as the diaphragm flexes. The lower end of the rod 46 bears a reduced diameter portion 50 so that a paddle 52 may swivel on the rod and yet be retained in position on the rod against sliding action. The paddle is U- or V-shaped as shown in FIGURE 4 so that coolant fluid flow in the conduit 14 as indicated in FIGURE 1 will cause the paddle to swivel on the rod 46 to a position transverse to the fluid current and present its greatest resistance to the latter.

Embodied in the insulator plug 36 is a terminal 54 and this terminal includes a contact means 56 in the form of a depending rod. The upper end of the rod 46 supports another electrical contact 58 which is also in the form of a rod and the two contacts are made to overlap as clearly depicted in FIGURE 2. With no fluid current, the contact 58 is free to approach the contact 56 from any angle as it is free to move in a circular zone.

A signal circuit is diagrammatically illustrated in FIGURE 2 to include a power supply or battery 60 and a light bulb 62 connected in series with the plug 30 and the terminal 54.

In operation of the switch in FIGURE 2 an adequate flow of coolant in the flow passage 14 will cause the contact 58 to move away from the contact 56 and the light 62 will go out—i.e.—if the coolant flow or supply is adequate, the light 62 will go out. With cessation of coolant flow or a lack of coolant supply the light 62 will go on and give a warning.

FIGURE 3 shows a modification in which two contacts 70 and 72 are employed to make contact and establish a signal circuit when the flow is adequate. In this construction, the contact 70 includes a metallic cylinder embodied in the terminal 74. The contact 72 is fixed to the end of a paddle rod 76. In this version any departure tendency of the rod 76 from a position coaxial with that of the housing 78 in excess of a predetermined minimum will establish the electrical circuit—a signal will be given that a required fluid flow is present.

I claim:

1. A flow switch comprising a housing adapted to form a closure for an opening in a conduit and having an aperture therein, paddle support means including a rod pivotally mounted at one end of said aperture and in electrical contact with said housing, a paddle remote from said housing and rotatable on said rod around the axis of the latter, a first electrical contact means on said support means and arranged to move in a path within said aperture as said paddle moves, an insulator plug retained within said aperture, second contact means including a terminal fixed within said insulator plug and extending along one side of said path and the arrangement being such that movement of said paddle and paddle support means with relation to said housing will make and break electrical contact between said first and second contact means.

2. A flow switch comprising a plug type housing to close an opening in a support defining a flow passage, said housing having a threaded end and an aperture extending therethrough, paddle means pivotally mounted at one end of said aperture and extending into and away from the latter, said paddle means including a paddle spaced from said housing and pivoted on said paddle means around an axis extending into said aperture, a first contact means on said paddle means arranged to move in a path within said housing, an insulator plug retained within said housing, and second contact means fixed within said insulator plug and extending along one side of said path.

3. A flow switch comprising a housing adapted to form a closure for an opening in a conduit, said housing having a through aperture therein, a rod pivoted intermediate its length at one end of said aperture, a self-orienting paddle swiveled on the axis of said rod remote from said housing, a first contact means on said rod and arranged to move in a path within said aperture, an insulator plug retained within said aperture, and second contact means including a terminal fixed to said insulator plug and extending along one side of said path.

4. A flow switch comprising a housing in the form of a threaded plug, said housing having an aperture therethrough, a rod intermediately pivoted and electrically connected to said housing at one end of said aperture, a self-orienting paddle supported by said rod remote from said housing, a first contact means on said rod and free to move in a circular zone within said aperture as said rod pivots, an insulator plug retained within the other end of said insulator plug, and second contact means retained by said insulator plug and extending along one side of said circular zone.

5. A flow switch comprising a housing defining a through aperture, a metal diaphragm and an insulator plug closing opposite ends of said aperture, paddle means including a rod fixed to said metal diaphragm to move as the latter flexes and a paddle outside said housing, said paddle being swiveled on said rod to rotate about the axis of the latter and shaped to assume a position transverse to a flow of liquid to the pressure of which said paddle may be subjected.

References Cited in the file of this patent
UNITED STATES PATENTS

| | | |
|---|---|---|
| 2,513,863 | Havens | July 4, 1950 |
| 2,981,195 | Payne et al. | Apr. 25, 1961 |
| 3,090,848 | Scholz | May 21, 1963 |